Patented Apr. 28, 1942

2,281,167

UNITED STATES PATENT OFFICE 2,281,167

GRANULAR MATERIAL

Ernest H. Nichols, Hagerstown, Md., assignor to The Funkhouser Company, Hagerstown, Md., a corporation of Maryland No Drawing. Application January 4, 1940, Serial No. 312,417

6 Claims. (Cl. 91—70)

This invention relates to granular material, known as roofing granules, used as a protective and ornamental coating for roofing of the asphalt-coated type, and for other architectural purposes. More particularly, the invention relates to roofing granules that are produced by crushing greenstone, screening the crushed greenstone to recover particles of the desired size or sizes, and artificially coloring the recovered particles.

Roofing granules have been produced in which the mineral particles have been left in their natural colors, but such granules have not been entirely satisfactory in that their colors have not been sufficiently brilliant, have been lacking in permanency, and have not been of sufficient variety. Therefore, various methods of applying color coatings to the screened granules, which will be hereinafter referred to as the "granule base," have been practiced, but the results have not been free from objection as the coatings have had a tendency to fade, have been more or less soluble so that their color pigments have been released and washed away during rain storms, and have been objectionable for other reasons including that of expense.

The present invention has as one of its objects to provide a color coating for greenstone base material, which will permanently adhere thereto, which will be non-fading, and which will be entirely weather-resistant.

A further object is to provide a color coating for a granule base consisting of greenstone which will not only be permanent, but which will also result in hardening the granule base material at and beneath the surface.

A still further object is to provide a mat finish color coating for greenstone base material so that the finished granules may properly adhere to the asphalt coating of the roofing.

In order to produce granules having the foregoing characteristics, at a minimum expense, I have developed a process whereby I produce a fluxing compound, to be later fired, on and beneath the surfaces of the granule base particles, which compound is developed in situ from the mineral contained within the base particles, thereby obviating the necessity of applying to the surfaces of said particles an expensive and separately prepared coating.

I have found that schistose greenstone lends itself to the production of granules of the present type in a very satisfactory manner as its composition includes certain minerals which will react with crude ortho-phosphoric acid to create a flux such as stated, and its structure, which is micro-crystalline, is such as will permit the acid to penetrate beneath the surfaces of the base particles. While I prefer to use the greenstone mentioned, from which to produce my granule base material, any other mineral or rock having substantially the same composition and structure may be used.

The greenstone to which I refer is that described in the Geological Atlas of the United States under the Fairfield-Gettysburg Folio for Pennsylvania (folio 225), by George W. Stose and F. Bascom, published in the United States Geological Survey, in 1929 (see p. 5 of that folio). As there shown, the rock may be found at Gladhill, Pennsylvania (see the first map in said folio). The chemical analysis of a typical sample of the greenstone is as follows:

| | Per cent |
|---|---|
| Loss on ignition | 1.78 |
| Water, $H_2O$ | .10 |
| Silica, $SiO_2$ | 46.60 |
| Alumina, $Al_2O_3$ | 16.55 |
| Iron oxide, $Fe_2O_3$ | 12.96 |
| Manganese oxide, $MnO$ | .33 |
| Titanium oxide, $TiO_2$ | 2.00 |
| Zirconium oxide, $ZrO_2$ | .25 |
| Calcium oxide, $CaO$ | 11.05 |
| Magnesium oxide, $MgO$ | 6.06 |
| Barium oxide, $BaO$ | Trace |
| Strontia, $SrO$ | Trace |
| Potassium oxide, $K_2O$ | 1.06 |
| Sodium oxide, $Na_2O$ | 2.25 |
| Phosphorus pentoxide, $P_2O_5$ | .10 |
| Carbon dioxide, $CO_2$ | .11 |
| Sulphur, $S$ | .01 |
| Copper, $Cu$ | Trace |

Those constituents of the greenstone that are essential to the formation of the fluxing compound which I develop in situ are calcium oxide, sodium oxide, iron oxide, potassium oxide, alumina, magnesia, and silica. All of these are present in the greenstone in the form of certain minerals which I will now set forth, together with their related essential oxides, as follows:

| Minerals | Essential oxides |
|---|---|
| Epidote | Calcium, magnesium, iron, silica. |
| Chlorite | Do. |
| Sericite | Potassium, sodium, aluminum, magnesium, iron, silica. |
| Chrysolite | Magnesium, iron, silica. |
| Calcite | Calcium. |
| Quartz | Silica. |

In the production of roofing granules according to the present invention, I take the greenstone as it comes from the ground and subject it to a crushing operation in any suitable form of crusher. This crushed material is then screened to recover particles of a size suitable for the base material. Suitably sized particles will pass an 8-mesh screen and be retained on a 35-mesh screen, but the invention is not restricted to these screen sizes. When producing a batch of granules according to my process, a pre-determined amount of the base material is placed in a suitable batch mixer, and together with an amount of finely ground color pigment of acid-resisting character, such as chrome oxide, if a green color is desired. The mixer is then operated until the individual particles comprising the base material are more or less evenly and completely coated with the pigment. A mixture of crude ortho-phosphoric acid and water is then introduced into the mixer and thoroughly mixed with the base material therein. The amount of said phosphoric acid and water so added should be enough to well moisten the granules and the fine pigment (if the same has been used). The preferred amount is somewhat variable, depending upon several factors, e. g., the amount and fineness of the pigment, the porosity of the stony granules, amount of calcium carbonate (or other material that rapidly reacts on phosphoric acid) in the stony material, and others. In many cases, about three to five gallons of 45% to 50% crude phosphoric acid diluted with one-half to two gallons of water per ton of granules is a suitable proportion. This acid and water mixture can conveniently represent a phosphoric acid of about 33% to 40% concentration. Due to the reaction of the acid with the minerals in the base material, the surfaces of the granule base particles acquire a coating consisting of acid phosphates perhaps mixed with neutral ortho-phosphates, and other salts of the phosphoric acid, which coating entraps the color pigment and binds the same to the base material when the latter is fired, a step of the process to be described later herein. Simultaneously with the formation of the coating mentioned, the water-diluted acid enters the surface pores of the base material, thereby forming within their surfaces ortho-phosphates and other salts which act as fluxing agents as a result of which the surface portions of the base particles become more readily fusible than their interiors. Crude phosphoric acid, when made from phosphate rock, often contains some hydrofluoric acid, as an impurity. That impurity may, in the present case, substantially increase the activity of the phosphoric acid on the components of the stony granules. At any event, the crude form of phosphoric acid is suitable for use in the process, and it is not necessary to use the more expensive "chemically pure" acid. As the ortho-phosphoric acid which has entered the pores reacts to produce, within the pores, the same substance of which the coating is composed, this substance not only coats the base particles, but also extends into their surface portions. Penetration of the base material by the acid will take place not only by physical means due to the minute pores in the base material which follow the granular structure of the greenstone, but will also occur because of direct chemical reaction between the acid and the various minerals referred to above which are haphazardly distributed throughout the granule base material and are included in its structure.

As examples of the formation of ortho-phosphates by the reaction between the ortho-phosphoric acid and some of the constituents of the greenstone, the following reactions are typical:

1. Calcite $(3CaCO_3)$ + ortho-phosphoric acid $(2H_3PO_4)$ = calcium ortho-phosphate $(Ca_3(PO_4)_2)$ + carbon dioxide $(3CO_2)$ + water $(3H_2O)$.

2. Witherite $(BaCO_3)$ + ortho-phosphoric acid $(2H_3PO_4)$ = barium ortho-phosphate $(Ba_3(PO_4)_2)$ + carbon dioxide $(3CO_2)$ + water $(3H_2O)$.

3. Magnesium carbonate $(3MgCO)$ + ortho-phosphoric acid $(2H_3PO_4)$ = magnesium ortho-phosphate $(Mg(PO_4)_2)$ + carbon dioxide $(3CO_2)$ + water $(3H_2O)$.

4. Calcium oxide plus an excess of ortho-phosphoric acid gives primary calcium phosphate and water.
    $CaO + 2H_3PO_4 \rightarrow Ca(H_2PO_4)_2 + H_2O$.
    $Ca(H_2PO_4)_2\ 316°\ C. \rightarrow Ca(PO_3)_2 + 2H_2O$.

5. Magnesium oxide plus ortho-phosphoric acid gives magnesium phosphate plus water.
    $MgO + 2H_3PO \rightarrow Mg(H_2PO_4)_2 + H_2O$.
    $Mg(H_2PO_4)_2\ 305°\ C. \rightarrow Mg(PO_3)_2 + 2H_2O$.

6. Sodium oxide plus ortho-phosphoric acid gives sodium phosphate plus water.
    $Na_2O + 2H_3PO_4 \rightarrow 2NaH_2PO_4 + H_2O$.
    $NaH_2PO_4\ 315°\ C. \rightarrow NaPO_3 + H_2O$.

7. Iron oxide plus ortho-phosphoric acid gives iron phosphate plus water.
    $Fe_2O_3 + 6H_3PO_4 \rightarrow 2Fe(H_2PO_4)_3 + 3H_2O$.
    $Fe(H_2PO_4)_3\ 315°\ C. \rightarrow Fe(PO_3)_3 + 3H_2O$.

8. Aluminum oxide plus ortho-phosphoric acid gives aluminum phosphate plus water.
    $Al_2O_3 + 6H_3PO_4 \rightarrow 2Al(H_2PO_4)_3 + 3H_2O$.
    $Al(H_2PO_4)_3\ 316°\ C. \rightarrow Al(PO_3)_3 + 3H_2O$.

In a similar manner, ortho-phosphoric acid attacks other minerals in the greenstone to form phosphates and complex double salts, for example, calcium ferrous phosphate,

$(Ca,Fe)_3(PO_4)_2.4H_2O$

After the granule base material has been treated in the mixer in the manner described, it is fired in a suitable kiln or furnace at temperatures ranging from 600° F. to 1200° F., according to the color to be produced. This firing step results in fusion of the coating which has been developed on the surface of the base material, also fusion of that surface portion of said material which has been penetrated by the acid, thus binding the pigment to the base in an insoluble, permanent coating which is an integral part of the granular material. The compound resulting from the firing step is a glassy mass impregnated with the coloring agent.

I have found that when firing at temperatures up to 800° F., it is advisable to use a muffle kiln through which the treated base material is carried on a suitable conveyor belt after having been fed thereon to a depth of approximately one-fourth of an inch. I have also found that when firing at temperatures above 800° F. an inclined rotary kiln of the conventional type is more suitable.

During the fusion process, the relatively soluble salts of ortho-phosphoric acid which have been developed on and immediately beneath the surfaces of the granule base particles are changed to the relatively insoluble salts of meta-phosphoric acid, a transformation which is depended upon to produce the resistance to weathering and permanence which is the desired feature of the final product. When the firing operation has been completed, the granules are discharged from the furnace into a cooler of any suitable type, from which they are conveyed to storage bins.

As an example of the reactions which occur when the treated granular base material is subjected to the heating step mentioned, the following is a typical example:

1. Magnesium ortho-phosphate $(Mg_3(PO_4)_2)$ + heat = magnesium meta-phosphate $(MgP_2O_6)$.
2. Primary sodium phosphate plus heat gives sodium meta-phosphate plus water.

$$2NaH_2PO_4 \rightarrow Na_2H_2P_2O_7 + H_2O$$
$$Na_2H_2P_2O_7 \rightarrow 2NaPO_3 + H_2O$$

As examples of formulae that may be followed for producing granules according to the present invention, the following are submitted:

Green

| | | |
|---|---|---|
| Greenstone granule base | lbs | 2000 |
| Chromium oxide $Cr_2O_3$ | lbs | 14 |
| Crude ortho-phosphoric acid $H_3PO_4$ 45% to 50% .5% to .6% fluorine | gals | 3½ |
| Water $H_2O$ fired at 800° F. to 1000° F. | gal | 1 |

Brown

| | | |
|---|---|---|
| Greenstone granule base | lbs | 2000 |
| Manganese oxide $MnO_2$ | lbs | 10 |
| Iron oxide $Fe_2O_3$ | lbs | 10 |
| Crude ortho-phosphoric acid $H_3PO_4$ 45% to 50% .5% to .6% fluorine | gals | 3½ |
| Water $H_2O$ fired at 1000° F. to 1200° F. | gal | ½ |

Red

| | | |
|---|---|---|
| Greenstone granule base | lbs | 2000 |
| Iron oxide $Fe_2O_3$ | lbs | 20 |
| Crude ortho-phosphoric acid $H_3PO_4$ 45% to 50% .5% to .6% fluorine | gals | 3½ |
| Water $H_2O$ fired at 600° F. to 1000° F. | gals | 2 |

Blue

| | | |
|---|---|---|
| Greenstone granule base | lbs | 2000 |
| Calcined blue oxide | lbs | 14 |
| Crude ortho-phosphoric acid $H_3PO_4$ 45% to 50% .5% to .6% fluorine | gals | 3½ |
| Water $H_2O$ fired at 700° F. to 900° F. | gal | 1 |

Black

| | | |
|---|---|---|
| Greenstone granule base | lbs | 2000 |
| No. 44 lampblack | lbs | 6 |
| Crude ortho-phosphoric acid $H_3PO_4$ 45% to 50% .5% to .6% fluorine | gals | 5 |
| Water $H_2O$ fired at 800° F. to 1000° F. | gal | 1 |

During the firing step of the herein described process, the granules do not become entirely vitrified and therefore the finished product does not have a highly glazed surface, such as will not properly adhere to the asphalt coating of the roofing. Instead, because of only partial fusion of the composition, a dull or mat surface is produced, such as will provide for proper adherence. Owing to the fact that the pores of the granule base material have become filled with the fused flux, the granules produced are correspondingly harder than otherwise, this being a highly important and desirable characteristic.

What is claimed is:

1. A process of making weather-resistant, color-permanent, stony granules suitable for use on asphalt-treated roofing felt, which comprises treating granules of schistose greenstone, of a size suitable as roofing granules, with an amount of liquid phosphoric acid sufficient to moisten said particles, and heating the moistened particles to about 600° F. to 1200° F. until the surfacing is glazed and weatherproof.

2. In the process of claim 1, the improvement which comprises applying phosphoric acid solution of about 33% through 40% strength.

3. In the process of claim 1, the improvement which comprises applying about 3.5 to 5 gallons of phosphoric acid solution per ton of stony granules.

4. A process as covered in claim 1, in which fine pigment of a relatively acid-resistant character is well mixed with the granules of stony material prior to the step of treating with phosphoric acid.

5. A process for coloring granules of schistose greenstone, which comprises coating said granules with powdered color pigment of acid-resisting character, subsequently forming ortho-phosphates on and beneath the surfaces of said granules by treatment of ingredients in the granules with crude ortho-phosphoric acid, and then heat-treating the granules to effect a conversion of the ortho-phosphates into meta-phosphates whereby to produce a coating on the granules comprising a glassy mass impregnated with the color pigment.

6. A process for coloring mineral granules formed of schistose greenstone, which comprises coating said mineral granules with powdered color pigment of acid-resisting character, subsequently forming ortho-phosphates on and beneath the surfaces of said granules by treatment of ingredients in the granules with crude ortho-phosphoric acid, and then heat-treating the granules at a temperature sufficient to effect a conversion of the ortho-phosphates into meta-phosphates whereby to produce a coating on the granules comprising a surface coated and impregnated with the color pigment.

ERNEST H. NICHOLS.